United States Patent
Wiker et al.

(10) Patent No.: US 12,375,012 B2
(45) Date of Patent: Jul. 29, 2025

(54) SAFETY BRAKING DEVICE WITH TWO BRAKING STAGES

(71) Applicant: Robert Bosch GmbH, Stuttgart (DE)

(72) Inventors: Juergen Wiker, Stuttgart (DE); Daniel Dennis, Nuertingen (DE); Florian Esenwein, Leinfelden-Echterdingen (DE)

(73) Assignee: Robert Bosch GmbH, Stuttgart (DE)

( * ) Notice: Subject to any disclaimer, the term of this patent is extended or adjusted under 35 U.S.C. 154(b) by 1069 days.

(21) Appl. No.: 17/289,019

(22) PCT Filed: Oct. 7, 2019

(86) PCT No.: PCT/EP2019/077005
§ 371 (c)(1),
(2) Date: Apr. 27, 2021

(87) PCT Pub. No.: WO2020/088883
PCT Pub. Date: May 7, 2020

(65) Prior Publication Data
US 2022/0001504 A1    Jan. 6, 2022

(30) Foreign Application Priority Data
Oct. 31, 2018  (DE) ..................... 10 2018 218 725.8

(51) Int. Cl.
*H02P 3/16*      (2006.01)
*B23Q 11/00*    (2006.01)
(Continued)

(52) U.S. Cl.
CPC ............ *H02P 3/16* (2013.01); *B23Q 11/0092* (2013.01); *H02K 7/145* (2013.01); *H02P 3/08* (2013.01);
(Continued)

(58) Field of Classification Search
CPC ....................................................... H02P 3/16
See application file for complete search history.

(56) References Cited

U.S. PATENT DOCUMENTS 7,055,417 B1 *   6/2006  Gass ...................... H01H 27/00
                                                       83/477.1
7,084,779 B2 *   8/2006  Uneyama .................. B27B 5/38
                                                         340/679

(Continued)

FOREIGN PATENT DOCUMENTS

CN          101801578 A         8/2010
CN          106457540 A         2/2017
(Continued)

OTHER PUBLICATIONS

International Search Report corresponding to PCT Application No. PCT/EP2019/077005, mailed Dec. 12, 2019 (German and English Language Document) (5 pages).

*Primary Examiner* — Jennifer S Matthews
(74) *Attorney, Agent, or Firm* — Maginot, Moore & Beck LLP (57) ABSTRACT

A safety braking device for a machine tool for braking a processing tool driven by an electric motor via an output unit, more particularly an output shaft, includes at least one braking device which is provided to halt rotation of the output unit in a braking process. The braking device has at least a first braking stage and a second braking stage. The disclosure further relates to a machine tool having the safety braking device and to a method for operating a safety braking device.

12 Claims, 3 Drawing Sheets

(51) Int. Cl.
*B27B 5/38* (2006.01)
*H02K 7/14* (2006.01)
*H02P 3/08* (2006.01)
*B27G 19/04* (2006.01)
*F16D 63/00* (2006.01)
*F16D 123/00* (2012.01)

(52) U.S. Cl.
CPC ............... *B27B 5/38* (2013.01); *B27G 19/04* (2013.01); *F16D 63/006* (2013.01); *F16D 2123/00* (2013.01)

(56) References Cited

U.S. PATENT DOCUMENTS

| | | | |
|---|---|---|---|
| 2006/0101960 A1* | 5/2006 | Smith | B27G 21/00 |
| | | | 83/58 |
| 2014/0090948 A1* | 4/2014 | Krishnarao | B23Q 11/0092 |
| | | | 192/130 |
| 2014/0260845 A1* | 9/2014 | Voong | B23D 59/001 |
| | | | 83/13 |
| 2019/0207539 A1* | 7/2019 | Westerby | H02P 3/22 |

FOREIGN PATENT DOCUMENTS

| | | | | |
|---|---|---|---|---|
| CN | 113492351 A | 10/2021 | | |
| DE | 198 09 939 A1 | 9/1999 | | |
| DE | 696 24 124 T2 | 6/2003 | | |
| DE | 103 17 636 A1 | 11/2004 | | |
| DE | 60 2004 005 115 T2 | 11/2007 | | |
| DE | 10 2008 054 694 A1 | 6/2010 | | |
| EP | 1468796 A1 * | 10/2004 | ........... | B27B 17/083 |
| EP | 2 397 271 A2 | 12/2011 | | |
| WO | 96/37350 A1 | 11/1996 | | |
| WO | 01/26064 A2 | 4/2001 | | |
| WO | 2009/040152 A1 | 4/2009 | | |

* cited by examiner

SAFETY BRAKING DEVICE WITH TWO BRAKING STAGES

This application is a 35 U.S.C. § 371 National Stage Application of PCT/EP2019/077005, filed on Oct. 7, 2019, which claims the benefit of priority to Serial No. DE 10 2018 218 725.8, filed on Oct. 31, 2018 in Germany, the disclosures of which are incorporated herein by reference in their entirety.

The disclosure relates to a safety braking apparatus for a machine tool.

BACKGROUND

Safety braking apparatuses are known from the prior art, for instance from DE 10 2008 054 694 A1.

SUMMARY

The disclosure is based on a safety braking apparatus for a machine tool for braking a cutting tool which is driven, in particularly rotatingly driven, by means of an electric motor via an output unit, in particular an output shaft, comprising at least one braking apparatus, which is provided to, in a braking operation, brake, in particular halt, a rotation of the output unit. According to the disclosure, the braking apparatus has at least a first braking stage and a second braking stage.

By a "safety braking apparatus" should be understood, in particular, an apparatus which, by means of at least the braking apparatus, brakes or halts a cutting tool in a situation in which the cutting tool presents a danger for the user. In particular, the safety braking apparatus brakes the cutting tool in the event of an approachment to or touching of the cutting tool by a user. The safety braking apparatus can be realized as a separate device for use in a machine tool, or else as part of a control apparatus of a machine tool. In one embodiment, the safety braking apparatus further comprises a computing unit and a sensor unit, wherein the computing unit communicates with at least one sensor of the sensor unit. The sensor is provided to detect a danger for a user, in particular an approachment of the user to the cutting tool and/or a touching of the cutting tool by the user. Accordingly, the sensor apparatus delivers a detection signal to the safety braking apparatus. An electronics assembly of the safety braking apparatus, in particular the computing unit, serves to control the braking apparatus. In particular, the electronics assembly of the safety braking apparatus, in particular the computing unit, is provided to, after detection of an approachment of the user to the cutting tool, and/or after detection of a contact of the user with the cutting tool, initiate, control and/or regulate a braking operation.

By "provided" should in particular be understood specifically equipped, designed and/or programmed.

By a "machine tool" should be understood an in principle arbitrary machine tool, which has a cutting tool which is driven by means of an electric motor via an output unit, in particular an output shaft, and is rotatably mounted. In particular, the machine tool can be a mains-operated or a cordless, battery-operated machine tool. The cutting tool can, in particular, also be realized as a toolholder. The cutting tool is connected in a substantially rotationally secure manner to the output unit, or at, least in one operating state of the machine tool, is connectable in a substantially rotationally secure manner to the output unit, for instance via a toolholder, so that a torque is transmissible from the output unit, in particular the output shaft, to the cutting tool. By "in a substantially rotationally secure manner" should at this point be understood that the cutting tool, in a braking operation, performs a relative rotation of less than 15%, in particular of less than 10%, quite especially of less than 5%, in relation to the output unit. By an "output unit" should be understood, in particular, an apparatus which is provided to transmit a torque to the output shaft. For instance, the output unit can be configured as a transmission stage. The torque is generated by the electric motor, in particular a "brushless DC motor" (BLDC motor) or an "electronically commutated motor" (EC motor), or alternatively an AC motor (universal motor). By using an EC motor, a direct driving of the output unit, in particular the output shaft, can be realized without the interposition of a gear mechanism or clutch. In this way, the components of the gear mechanism or clutch can advantageously be dispensed with, so that a more compact, lighter and more favorable machine tool can be realized. In addition, a rotational mass and/or rotational energy of the drive unit and/or output unit, which mass and/or energy is to be braked during a braking operation, can advantageously be reduced, and hence a particularly short time until the cutting tool is brought to a halt can be achieved. It should be noted that electric motors of this type are known to the person skilled in the art. The output unit, in particular an output shaft, enables a rotation of the cutting tool by rotation at least of the output shaft about its longitudinal axis. Examples of such machine tools comprise, in particular, drills, brush cutters, lawn mowers, circular saws, bench saws, crosscut saws, miter saws, or other machine tools which appear sensible to the person skilled in the art. In one embodiment, the machine tool can be realized as a portable hand-held power tool, for instance as a cordless, battery-operated hand-held circular saw having a cutting tool which is driven by means of the electric motor via an output shaft and is configured as a circular saw blade, and having a sensor plate, which registers an approachment of a user to the circular saw blade and a contact of a body part of the user with the cutting tool.

By a "braking apparatus" should be understood an apparatus which serves to slow or halt the rotation of the cutting tool in the event of detection of an approachment to or a touching of the cutting tool by a user. By "braking" should be understood, in particular, a reduction of the turning speed or rotation speed of the cutting tool. By "halt" should be understood, in particular, that the cutting tool is slowed at least sufficiently heavily that a residual rotational frequency amounts to less than 0.5 Hz, preferably less than 0.1 Hz. Preferably, "halting" denotes the attainment of the standstill of the cutting tool with respect to its rotational motion. The standstill here characterizes the first attainment of the zero point of the rotary speed of the output shaft, irrespective of whether subsequently an ongoing (slight) rotation of the drive shaft—for instance due to material relaxation effects—occurs.

The braking apparatus is realized as an at least two-stage braking apparatus. The braking apparatus therefore has at least a first braking stage and a second braking stage. By a "braking stage" should be understood, in particular, an implementation of the safety apparatus that makes it possible for a braking effect on the output unit, in particular an output shaft, which braking effect is characteristic of the braking stage, to be exerted. In particular, a braking stage can be construed as an operating mode or braking mode of the safety braking apparatus. In one embodiment, the first braking stage and the second braking stage, in terms of a braking effect exertable or exerted in a braking operation, are different. In this way, in one embodiment, the first braking stage can be realized, for instance, with a light braking effect, and the second braking stage with a heavy braking effect.

In one embodiment of the safety braking apparatus, the braking apparatus is provided to, in a braking operation, apply the first braking stage as soon as an approachment of a user to the cutting tool is recognized or detected by the sensor apparatus. In this case, the rotation of the output unit is braked, in particular halted, substantially by means of or by application of the first braking stage of the braking apparatus. By "substantially" should here be understood that the entire braking effect acting on the output unit is at least 60%, in particular at least 80%, quite particularly 100% generatable or generated by means of or by application of the first braking stage. In addition, in one embodiment of the safety braking apparatus, the braking apparatus is provided to, in a braking operation, apply the second braking stage as soon as a further approachment of a user to the cutting tool is recognized or detected by the sensor apparatus, or, in particular, a touching of the cutting tool by a body part of the user is detected. In this case, the rotation of the output unit is braked, in particular halted, substantially by means of or by application of the second braking stage of the braking apparatus. By "substantially" should here be understood that the entire braking effect acting on the output unit is at least 60%, in particular at least 80%, quite particularly 100% generatable or generated by means of or by application of the second braking stage. According to the disclosure, a two-stage braking apparatus, in which the first braking stage already takes care of a slowing of the cutting tool, and thus a reduction of the rotational energy, as soon as the approachment of a user to the cutting tool is detected, can thus be realized. Should the user come with a body part still closer to the cutting tool, or even touch this, a braking operation (emergency braking operation) is effected, in which the second braking stage takes care of a particularly rapid slowing of the rotating cutting tool. As a result of the upstream first braking stage, up to the point of further approachment to, or even touching of, the cutting tool by the body part of the user, some of the original rotational energy is already dissipated. Thus, up to the point of standstill of the cutting tool, a small residual rotational energy has consequently to be reduced, so that a faster and safer braking operation can be obtained. In addition, in particular where the second braking stage is realized as the mechanical braking stage, a low load on the mechanical components of the braking stage can be obtained. The second braking stage is thus more durable and/or can be of simpler and more compact construction. It is also conceivable that, in a braking operation, the second braking stage is not required—since the user moves no closer to the cutting tool—and is therefore not used. In this case, in particular where the second braking stage is realized as the mechanical braking stage, the machine tool can be more easily started up again, since, for instance, in particular no resetting, tightening or exchanging of mechanical components, in particular of an actuator element, is necessary. The sensor for detecting a danger for a user, in particular for detecting an approachment of the user to the cutting tool, and/or a touching of the cutting tool by the user, can in one illustrative embodiment be realized as a capacitively measuring sensor (for instance by means of an alternating field). In a hand-held circular saw, a sensor plate can be arranged, for instance, next to the saw blade (cutting tool) at a distance from the saw blade, wherein the sensor plate is provided to differentiate between an approachment of human skin to the saw blade and a touching of human skin with the saw blade, and to deliver appropriate detection signals. In particular, the sensor plate has a short distance to the saw blade (of 1 to 10 mm, in particular of 1.5 to 3 mm, yet preferably of 2 mm) and is electrically insulated from the housing of the hand-held circular saw. The sensor plate is electrically connected to an electronics assembly of the hand-held circular saw, wherein the electronics assembly is provided to, in response to the detection of an approachment of human skin to the saw blade and the detection of a touching of human skin with the saw blade, initiate a braking operation by use of the first braking stage or the second braking stage. By a "further approachment" should be understood, in particular, that the distance between that body part of the user that is approaching the cutting tool, and the cutting tool, is lessening.

In one embodiment of the safety braking apparatus, the first braking stage of the braking apparatus is configured as an electronic braking stage. By an "electronic braking stage" should be understood, in particular, that the braking effect is generatable or generated by means of electronic components of the safety braking apparatus. In one embodiment of the safety braking apparatus, the first braking stage of the braking apparatus is realized by means of a reversal of the electric motor. By a "reversal" should be understood, in particular, an operation of the electric motor in opposite polarity, or alternatively a short-circuiting of the windings of the electric motor. In this way, by means of the electronics of the electric motor, the latter can be braked. Advantageously, the first braking stage, for the generation of a braking effect, uses devices, such as, for instance, the electric motor, already provided in the machine tool. In this way, a first braking stage, which can be realized in a particularly simple and cost-effective manner and is particularly compact in terms of its design, can be realized.

In one embodiment of the safety braking apparatus, the first braking stage of the braking apparatus is provided to, in a braking operation, halt a rotation of the output unit at least within 1,000 milliseconds, in particular at least within 500 milliseconds, quite especially at least within 200 milliseconds. It can in this way be ensured that, in the event of a further approachment of the user to the rotating cutting tool, the latter is brought to a standstill appropriately quickly before the user touches the cutting tool. By "halt" should be understood, in particular, that the cutting tool is braked at least sufficiently heavily that a residual rotational frequency amounts to less than 0.5 Hz, preferably less than 0.1 Hz. Preferably, "halting" denotes the attainment of the standstill of the cutting tool with respect to its rotational motion. The standstill here characterizes the first attainment of the zero point of the rotational speed of the output shaft, irrespective of whether subsequently an ongoing (slight) rotation of the drive shaft—for instance due to material relaxation effects—occurs.

In one embodiment of the safety braking apparatus, the second braking stage of the braking apparatus is configured as an electronic braking stage. In one embodiment of the safety braking apparatus, the second braking stage of the braking apparatus is likewise realized by means of a reversal of the electric motor.

In an alternative embodiment of the safety braking apparatus, the second braking stage of the braking apparatus is configured as a mechanical braking stage having at least one mechanical braking element. The braking effect is here realized by mechanical retardation or blocking of the rotation of the output unit, in particular the output shaft. In this way, a high current, as would be necessary to produce short braking times by use of a second braking stage, based on a reversal of an electric motor, can advantageously be avoided. Such high currents could lead to damage to the electronics and/or the electric motor, which damage would result in the exchange of the electric motor. By means of the realization of the second braking stage as a mechanical braking stage, the service life of the tool can therefore advantageously be increased. In one illustrative embodiment, the mechanical braking stage can be realized, for instance, by a two-part braking apparatus, wherein a first braking apparatus part and a second braking apparatus part are configured as complementary component parts of an at least two-part claw clutch (or thereto equivalent: claw brake), wherein the first braking apparatus part and the second braking apparatus part respectively have at least one toothed element, which toothed elements are provided to, in a braking operation, intermesh, and in this way brake, in particular halt, a rotation of the output unit. The first braking apparatus part here forms a first claw clutch part, and the second braking apparatus part here forms a second claw clutch part. By a "two-part claw clutch" should here be understood a clutch which functions by positive-locking coupling, in that toothed elements on the two braking apparatus parts are brought into mutual engagement and thus enable a torque transmission in consequence of a relative motion of the two braking apparatus parts one to the other in the rotational direction. By realization of the safety braking apparatus by means of a claw clutch, a positive-locking connection can be utilized to perform a braking operation (emergency braking operation) in a particularly fast and safe manner. The first braking apparatus part is in one embodiment arranged in a rotationally secure manner on the output unit, in particular on the output shaft. The second braking apparatus part is provided to be connected in a substantially rotationally secure manner to another component part of the machine tool, in particular, for instance, a housing, a gearbox casing, a motor casing or another structure of the machine tool, and thus to be arranged at least substantially in a rotationally secure manner in relation to the machine tool. In one embodiment, the second braking apparatus part can be provided to be substantially immovably connected to the other component part of the machine tool, and thus not only in a substantially rotationally secure manner in relation to the machine tool. In one illustrative embodiment, the second braking apparatus part is designed to be substantially immovable in relation to the motor casing of the machine tool. In this way, in particular a free rotation of the second braking apparatus part with respect to the machine tool and also with respect to the output unit, in particular with respect to the output shaft, and thus with respect to the first braking apparatus part connected in a substantially rotationally secure manner to the output unit, can be prevented. By "in a substantially rotationally secure manner" should be understood that a respective braking apparatus part is not essentially mounted displaceably (rotatably) or slidingly in the direction of the periphery of the output unit, in particular the output shaft. By "the first braking apparatus part is arranged in a substantially rotationally secure manner on the output unit" should be understood that the first braking apparatus part is connected to the output unit, in particular the output shaft, co-rotatingly with a rotary motion of the output unit, in particular the output shaft, wherein by "substantially" should be permitted a maximum relative motion of output unit, in particular output shaft, and first braking apparatus part one to another, which is less than 15°, in particular less than 10°, quite especially less than 5°. In one illustrative embodiment, the maximally permissible relative motion of the first braking apparatus part amounts to 12.5°. In particular this relative motion occurs only in the event of a very large applied torque on the first braking apparatus part, as can occur in a sudden braking operation. By "the second braking apparatus part is arranged in a substantially rotationally secure manner, in particular arranged in a rotationally secure manner in relation to the machine tool", should be understood that a maximum relative motion of that component part of the machine tool to which the second braking apparatus part is fastened, and the second braking apparatus part one to another, should be permitted, which relative motion amounts to less than 30°, in particular less than 10°, quite especially less than 5°. In one illustrative embodiment, the maximally permissible relative motion of the second braking apparatus part amounts to 15°. By "toothed elements" should be understood design-related projections both of the first braking apparatus part and of the second braking apparatus part, which projections are provided to be brought into mutual engagement. The toothed elements of one braking apparatus part here at the same time form recesses which receive toothed elements of the other braking apparatus part, so that, upon interaction of the braking apparatus parts, projections (toothed elements) and recesses (depressions between adjacent toothed elements) form pairs arranged complementary to one another. In the event of a braking operation, the toothed elements are brought into mutual engagement in such a way that, by torque transmission between the (co-rotating) first braking apparatus part arranged in a substantially rotationally secure manner on the output unit and the second braking apparatus part arranged, in relation to the output unit, in an at least substantially rotationally secure manner on the machine tool, can be generated a torque transmission which counteracts the rotational motion of the first braking apparatus part and in this way brakes, in particular halts or blocks, the rotation of the output unit, in particular the output shaft. In one embodiment, the toothed elements are equidistant and, in particular, provided in such a way on the respective braking apparatus part that—in relation to the rotational axis of the output unit, in particular the output shaft—they are arranged rotationally symmetrically to this latter.

By means of a mechanical braking stage, a particularly reliable braking operation having particularly short braking times can be enabled. In one embodiment of the safety braking apparatus, the second braking stage of the braking apparatus is provided to, in a braking operation, halt a rotation of the output unit at least within 50 milliseconds, in particular at least within 20 milliseconds, quite especially at least within 5 milliseconds. By "halt" should be understood, in particular, that the cutting tool is braked at least sufficiently heavily that a residual rotation frequency amounts to less than 0.5 Hz, preferably less than 0.1 Hz. Preferably, "halting" denotes the attainment of the standstill of the cutting tool with respect to its rotational motion. The standstill here characterizes the first attainment of the zero point of the rotary speed of the output shaft, irrespective of whether subsequently an ongoing (slight) rotation of the drive shaft—for instance due to material relaxation effects—occurs.

The disclosure also relates to a machine tool, in particular a hand-held machine tool, in particular a hand-held circular saw, having a cutting tool configured as a circular saw blade, comprising a safety braking device according to the disclosure. In this way, for the slowing of a motion, in particular a rotation, of the cutting tool, a particularly short braking time, determined between a triggering of a braking operation up to the halting of the cutting tool, is attained. Thus, the safety of a user of the machine tool can be markedly increased. In particular, adaptive braking operations tailored to the situation, in particular an injury risk, can be realized, so that an invariably drastic slowing can be dispensed with. In this way, the components of the safety braking apparatus can be more simply and more compactly realized and also used longer, since the load during the performance of a braking operation is reduced.

In one illustrative embodiment of the machine tool, this further has a sensor plate, which detects an approachment to or touching of the cutting tool by a user, in particular a contact of human skin with the cutting tool. After the detection of an approachment to or touching of the cutting tool by a user, an electronics assembly of the machine tool initiates the triggering of the actuator element, which thereupon triggers a braking operation. The actuator element here actively moves the first braking apparatus part in order to bring the two braking apparatus parts into mutual engagement in a braking operation and in this way to brake, in particular halt, a rotation of the output unit, in particular the output shaft. At the same time, the actuator element effects, by the movement of the first braking apparatus part, the decoupling of the output unit from the drive unit.

The disclosure further relates to a method for operating a safety braking apparatus according to the disclosure as previously described, comprising at least one braking apparatus, which is provided to, in a braking operation, brake, in particular halt, a rotation of the output unit, wherein the braking apparatus has at least a first braking stage and a second braking stage. According to the disclosure, in a first method step, upon the recognition of an approachment of a user to the cutting tool, the rotation of the output unit is at least substantially braked, in particular halted, by means of the first braking stage of the braking apparatus, and, in a second method step, in particular upon recognition of a further approachment by the user to the cutting tool, or upon recognition of a further approachment of the user to the cutting tool, in particular upon a touching of the cutting tool by the user, the rotation of the output unit is at least substantially braked, in particular halted, by means of the second braking stage of the braking apparatus.

BRIEF DESCRIPTION OF THE DRAWINGS

The disclosure is explained in greater detail, on the basis of illustrative embodiments represented in the drawings, in the following description. The drawings, the description and the claims contain numerous features in combination. The person skilled in the art will expediently consider the features also in isolation and put them together to form sensible further combinations. Same reference symbols in the figures denote same elements.

DETAILED DESCRIPTION

Figure 1:
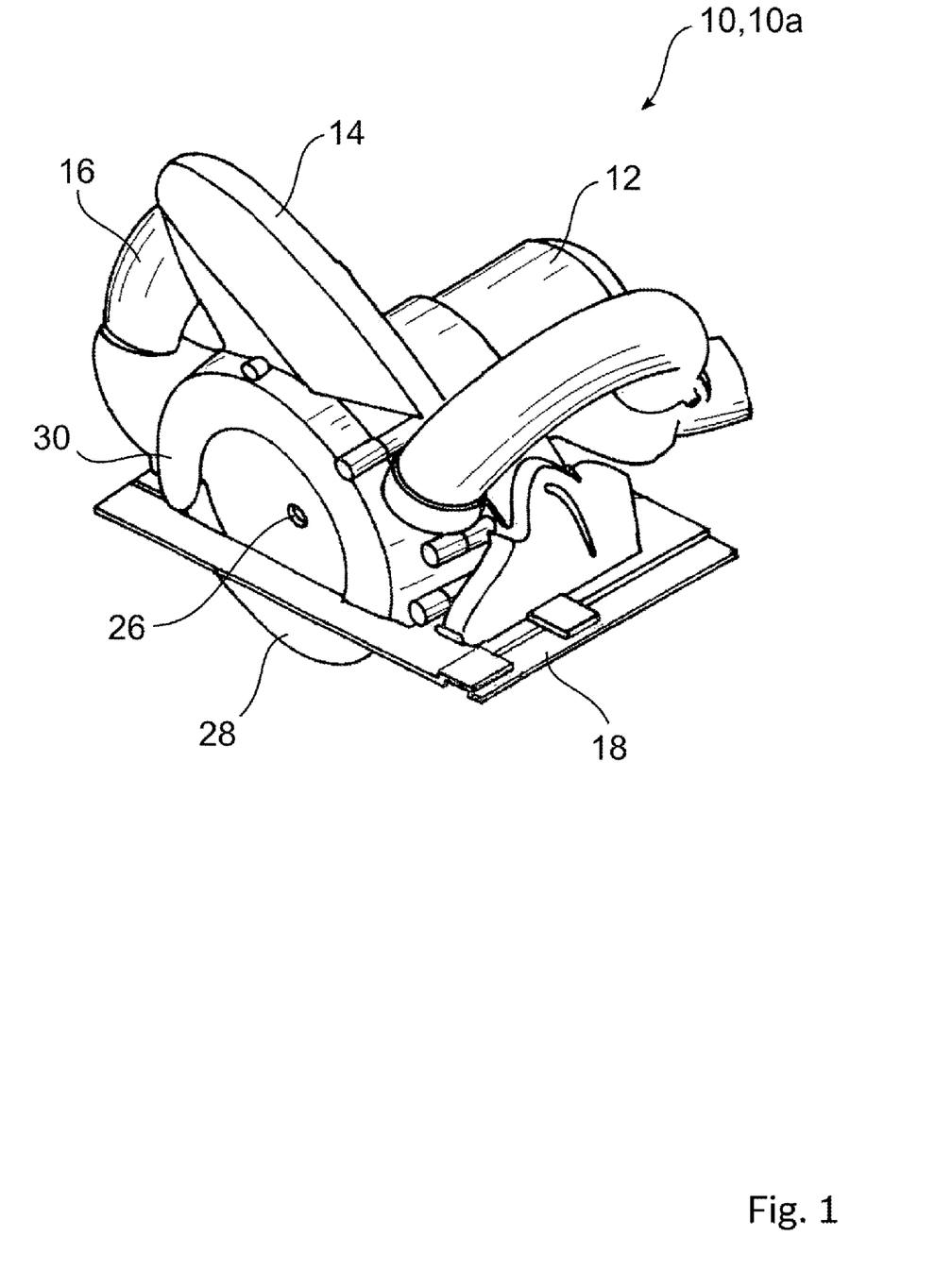
FIG. 1: shows a machine tool according to the disclosure in perspective representation.

FIG. 1 shows a machine tool 10 according to the disclosure, realized as a hand-held circular saw 10a. It should be pointed out that the comments should not be deemed to be limited to a hand-held circular saw 10a, but rather the technical teachings on which the comments are based are in principle also transferable to any other machine tools which appear sensible to a person skilled in the art, in particular, for instance, drills, lawn mowers, brush cutters or the like.

The hand-held circular saw 10a comprises a first housing, which is configured as a motor casing 12, and a second housing 14. The hand-held circular saw 10a has a handle and a baseplate 18 for guidance of the hand-held circular saw 10a. The hand-held circular saw 10a has for its power supply a rechargeable battery (not represented in detail here). In an alternative or additional embodiment of the hand-held circular saw 10a, a mains-dependent operation of the hand-held circular saw 10a can also be provided.

Figure 2:
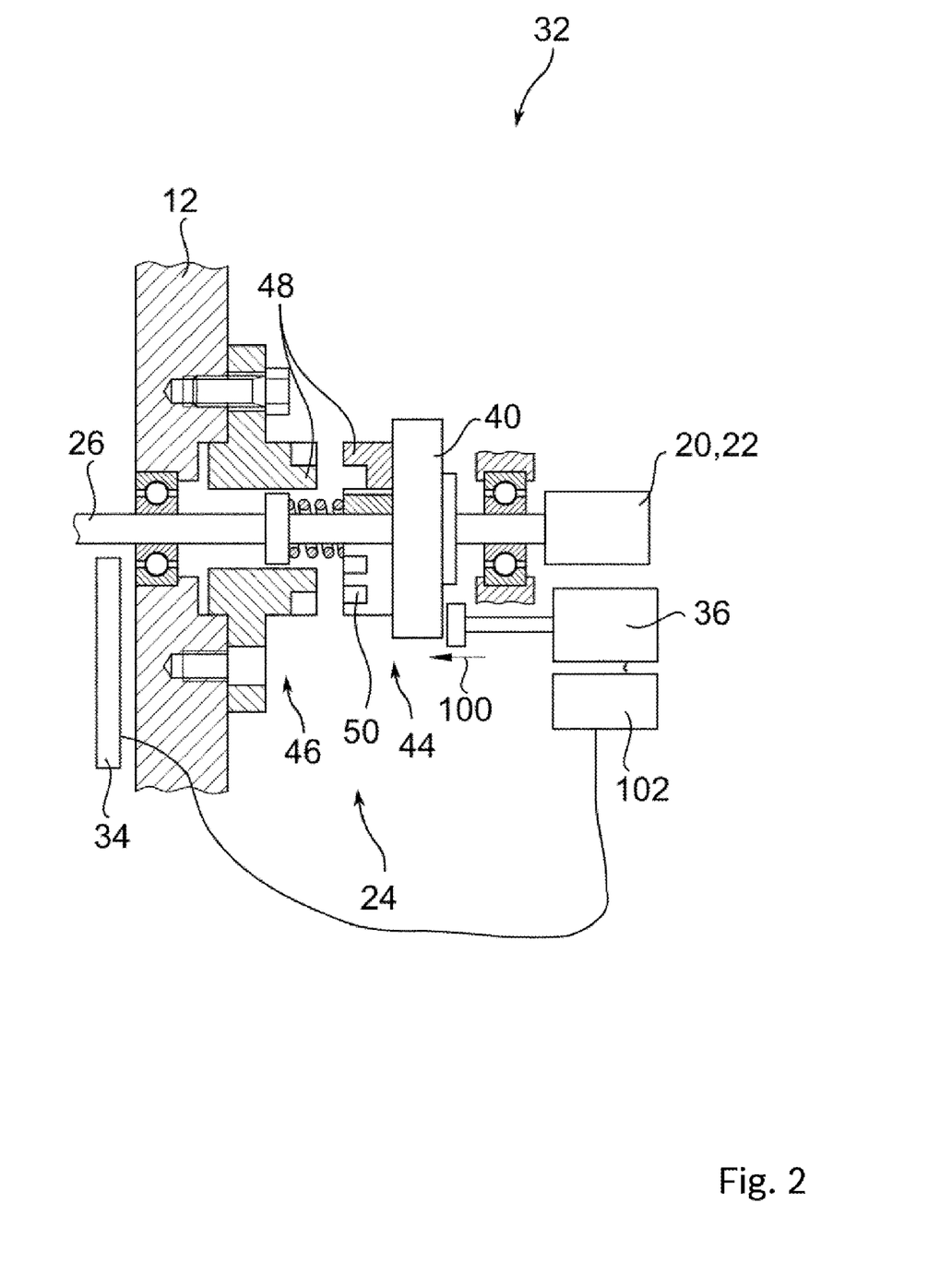
FIG. 2: shows a sectional representation through parts of the machine tool, together with safety apparatus and braking apparatus according to the disclosure, in schematic representation.

The motor casing 12 encloses an interior in which at least one brushless electric motor 20 is arranged. As represented in FIG. 2, in a work operation the motor 20 rotatingly drives, via an output shaft 26 which is part of an output unit, a cutting tool 28 (cf. FIG. 1). The cutting tool 28 is here configured as a saw blade, in particular as a circular saw blade. A saw blade cover 30 protects from a touching of the cutting tool 28 and from workpiece chips of a workpiece which are flung out by the cutting tool 28 (cf. FIG. 1).

A safety braking apparatus 32 is provided to brake the cutting tool 28 as soon as an approachment of a human body part, such as, for instance, a hand, is detected with a sensor 34 of the hand-held circular saw 10a. In this illustrative embodiment, the sensor 34 is realized by a capacitively measuring sensor. The sensor 34 enables a detection of a body part nearing the cutting tool 28, on the basis of capacitive measurements (for instance by means of an alternating field), wherein, in consequence of a detection, a detection signal is generated and delivered to a control apparatus of the hand-held circular saw 10a (cable connection in FIG. 2 between sensor 34 and electronics assembly 102). Sensors of this type are known to the person skilled in the art.

The safety braking apparatus 32 has at least a first braking stage 22 and a second braking stage 24. The first braking stage 22 and the second braking stage 24, in terms of a braking effect exertable in a braking operation, are designed differently. The first braking stage 22 of the safety braking apparatus 32 is configured as an electronic braking stage 22, in that, during a braking operation, the brushless electric motor 20 is operable by means of a reversal, so that it acts as a motor brake. In this case, the electric motor 20 exerts a force on the output shaft 26, which force is directed counter to the rotation of the output shaft 26—and counter to the own rotation of the motor shaft—and thus brakes said output shaft. The thus realized first braking stage 22 is basically provided to, in a braking operation, halt a rotation of the output shaft 26 at least within the 200 milliseconds.

The second braking stage 24 is configured as a mechanical braking stage 24 having at least one mechanical braking element. As represented, the second braking stage 24 is configured as an at least two-part claw clutch having a first claw clutch part 44 (first braking apparatus part) and a second claw clutch part 46 (second braking apparatus part), wherein the first claw clutch part 44 is arranged in a substantially rotationally secure and axially movable manner on the output shaft 26. The second claw clutch part 46 is arranged in a substantially rotationally secure, in particular substantially immovable manner, in relation to the machine tool, i.e. in relation to the motor casing 12. The first claw clutch part 44 and the second claw clutch part 46 respectively have more than one toothed element 48, which are provided to, in a braking operation, intermesh (not represented in detail) and, in this way, to brake, in particular halt, a rotation of the output shaft 26. In a braking operation by means of the second braking stage 24, the first claw clutch part 44 is moved in the direction of the second claw clutch part 46 axially along the output shaft 26 (in the direction 100). As a result of the axial movement of the first claw clutch part 44 relative to the second claw clutch part 46, a coupling of first claw clutch part 44 and second claw clutch part 46 is performed, i.e. the clutch is closed. The toothed elements 48 of the first claw clutch part 44 and of the second claw clutch part 46 consequently intermesh and form a form closure. Due to the form closure, a torque directed counter to the rotation of the output shaft 26 acts between first claw clutch part 44 and second claw clutch part 46. Consequently, the rotation of the output shaft 26 and of the first claw clutch part 44 is braked, in particular halted or blocked.

In the illustrative embodiment of FIG. 2, the first claw clutch part 44 is moved by means of the actuator element 36 axially, i.e. in the direction 100. The actuator element 36 is here configured as a lifting unit, which, triggered by a current flow through the lifting unit, executes a lever movement, wherein the first claw clutch part 44 is moved in the axial direction 100. The lever movement takes place in a time of under 5 ms, in particular under 1.5 ms.

The second braking stage 24 is here basically provided to, in a braking operation, halt a rotation of the output shaft 26 within 2 milliseconds.

In an alternative illustrative embodiment, the second braking stage 24 can likewise be configured as an electronic braking stage 24, for instance analogously to the first braking stage 22 (cf. above).

Figure 3:
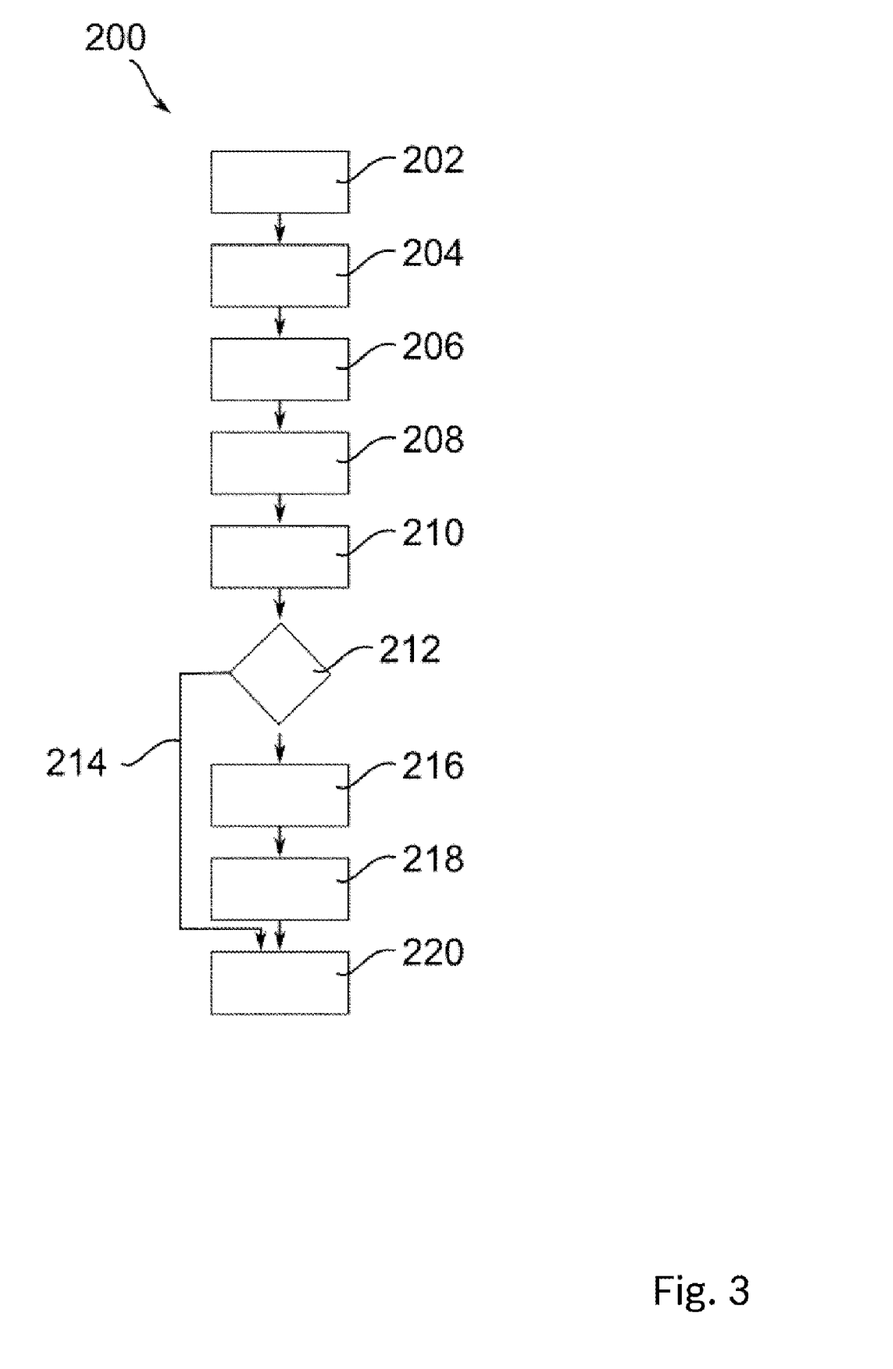
FIG. 3: shows a flow chart of an exemplary braking operation.

In FIG. 3 is represented a flow chart, which depicts an exemplary course of a braking operation 200 using the method according to the disclosure for operating the safety braking apparatus 32. During the operation of the machine tool 10, in particular the hand-held circular saw 10a, the cutting tool, in the starting situation 202, rotates. In a method step 204, the approachment of a user to the cutting tool 28 is detected by means of the sensor 34 of the sensor apparatus. Thereupon, the rotation of the output unit, in particular the output shaft 26, is braked, in particular halted, at least substantially by means of the first braking stage 22 in method step 208, after activation of the braking operation in method step 206. In method step 210, the sensor 34 detects a further approachment of the user to the cutting tool 28, in particular a touching of the cutting tool 28 by the user is detected by means of the sensor 34. Thereupon, in method step 212, an enquiry is made as to whether the cutting tool stands ready. If this is the case, the braking operation is terminated via the arrow 214, the cutting tool 28 is in the end state 220. If, on the other hand, a rotation of the cutting tool 28 is recognized, in method step 218 the rotation of the output unit, in particular the output shaft 26, is braked, in particular halted, at least substantially by means of the second braking stage 24, after the braking operation has been initiated in method step 216. This now occurring emergency braking operation by means of the second braking stage leads to halting of the cutting tool in the end state 220.

The invention claimed is:

1. A safety braking apparatus for a machine tool for braking a cutting tool which is driven by an electric motor via an output unit, comprising:
a computing unit;
at least one braking apparatus comprising at least a first brake configured as an electronic brake and a second brake configured as a mechanical brake having at least one mechanical brake, each of the first brake and the second brake configured to brake the output unit by at least 60% from an initial rotational speed or halt a rotation of the output unit,
wherein the at least one braking apparatus is configured to first apply the first brake in response to at least one sensor detecting an approachment of a user to the cutting tool and communicating with the computing unit, and to further apply the second brake in response to the at least one sensor detecting a further approachment of the user to the cutting tool or a touching of the cutting tool by a body part of the user and communicating with the computing unit.

2. The safety braking apparatus as claimed in claim 1, wherein the first brake and the second brake are configured to exert different effects.

3. The safety braking apparatus as claimed in claim 1, wherein the first brake is realized via a reversal of the electric motor.

4. The safety braking apparatus as claimed in claim 1, wherein the first brake is configured to, in the braking operation, halt the rotation of the output unit within at most 1,000 milliseconds.

5. The safety braking apparatus as claimed in claim 4, wherein the first brake is configured to halt the rotation of the output unit within at most 500 milliseconds.

6. The safety braking apparatus as claimed in claim 4, wherein the first brake is configured to halt the rotation of the output unit within at most 200 milliseconds.

7. The safety braking apparatus as claimed in claim 1, wherein the second brake is configured to halt the rotation of the output unit within at most 50 milliseconds.

8. The safety braking apparatus as claimed in claim 7, wherein the second brake is configured to halt the rotation of the output unit within at most 20 milliseconds.

9. The safety braking apparatus as claimed in claim 7, wherein the second brake is configured to halt the rotation of the output unit within at most 5 milliseconds.

10. The safety braking apparatus as claimed in claim 1, wherein the output unit includes an output shaft configured to drive the cutting tool.

11. A hand-held machine tool, comprising:
an output unit;
an electric motor configured to drive a cutting tool via the output unit; and
a safety braking apparatus comprising:
at least one braking apparatus comprising at least a first brake configured as an electronic brake and a second brake configured as a mechanical brake having at least one mechanical brake, each of the first brake and the second brake configured to brake the output unit by at least 60% from an initial rotational speed or halt a rotation of the output unit,
wherein the at least one braking apparatus is configured to first apply the first brake in response to at least one sensor detecting an approachment of a user to the cutting tool and communicating with the computing unit, and to further apply the second brake in response to the at least one sensor detecting a further approachment of the user to the cutting tool or a touching of the cutting tool by a body part of the user and communicating with the computing unit.

12. A method for operating a safety braking apparatus having at least one braking apparatus configured to brake or halt a rotation of an output unit of a machine tool via which an electric motor of the machine tool drives a cutting tool, the method comprising:

in response to detecting an approachment of a user to the cutting tool, braking the output unit by at least 60% from an initial rotational speed or halting the rotation of the output unit via a first brake of the at least one braking apparatus configured as an electronic brake; and in response to detecting a further approachment of the user to the cutting tool or a touching of the cutting tool by the user, braking the output unit by at least 60% from an initial rotational speed or halting the rotation of the output unit via a second brake of the braking apparatus configured as a mechanical brake.

\* \* \* \* \*

UNITED STATES PATENT AND TRADEMARK OFFICE
CERTIFICATE OF CORRECTION

Page 1 of 1

PATENT NO. : 12,375,012 B2
APPLICATION NO. : 17/289019
DATED : July 29, 2025
INVENTOR(S) : Wiker et al.

It is certified that error appears in the above-identified patent and that said Letters Patent is hereby corrected as shown below:

In the Claims

In Claim 2, at Column 10, Line 16: "different effects" should read --different braking effects--.

Signed and Sealed this
Eighteenth Day of November, 2025

John A. Squires
*Director of the United States Patent and Trademark Office*